(12) United States Patent
Johnson

(10) Patent No.: US 8,485,496 B2
(45) Date of Patent: Jul. 16, 2013

(54) ELECTRONIC FLUSH VALVE WITH OPTIONAL MANUAL OVERRIDE

(75) Inventors: Dwight N. Johnson, Carlsbad, CA (US); Donna D. Johnson, legal representative, Carlsbad, CA (US)

(73) Assignee: Sloan Valve Company, Franklin Park, IL (US)

( * ) Notice: Subject to any disclaimer, the term of this patent is extended or adjusted under 35 U.S.C. 154(b) by 785 days.

(21) Appl. No.: 12/624,039

(22) Filed: Nov. 23, 2009

(65) Prior Publication Data

US 2011/0121213 A1    May 26, 2011

(51) Int. Cl.
*F16K 31/12* (2006.01)

(52) U.S. Cl.
USPC ......... 251/29; 251/26; 251/30.02; 251/30.03; 251/129.04

(58) Field of Classification Search
USPC .............. 251/26, 30.01–30.03, 40, 129.04, 251/45
See application file for complete search history.

(56) References Cited

U.S. PATENT DOCUMENTS

| | | | |
|---|---|---|---|
| 1,912,937 A | 6/1933 | George | |
| 2,953,937 A | 9/1960 | Jackson et al. | |
| 3,008,682 A * | 11/1961 | Filliung et al. | 251/19 |
| 3,332,445 A | 7/1967 | Allen | |
| 4,272,052 A | 6/1981 | Gidner | |
| 4,327,891 A | 5/1982 | Allen et al. | |
| 4,756,031 A | 7/1988 | Barrett | |
| 4,793,588 A | 12/1988 | Laverty, Jr. | |
| 4,860,990 A | 8/1989 | Fukuzawa et al. | |
| 4,977,923 A | 12/1990 | Cho | |
| 5,169,118 A | 12/1992 | Whiteside | |
| 5,195,720 A | 3/1993 | Nortier et al. | |
| 5,244,179 A | 9/1993 | Wilson | |
| 5,295,655 A | 3/1994 | Wilson | |
| 5,431,181 A | 7/1995 | Saadi et al. | |
| 5,967,182 A | 10/1999 | Wilson | |
| 5,996,965 A | 12/1999 | Eichholz et al. | |

(Continued)

FOREIGN PATENT DOCUMENTS

WO    WO 99/24745    5/1999

OTHER PUBLICATIONS

Sloan, G2 Optima plus, "Installation Instructions for Retrofit and Complete Valve Installation," Code No. 0816452, Rev. 1, Sep. 2006.

(Continued)

*Primary Examiner* — John K Fristoe, Jr.
*Assistant Examiner* — Marina Tietjen
(74) *Attorney, Agent, or Firm* — Greer, Burns & Crain, Ltd

(57) ABSTRACT

A flush valve assembly including a discharge receiver with a plug opening therein, a sleeve, a main valve assembly positioned within the sleeve, and a main diaphragm sealingly connected between the main valve assembly and the sleeve. The main diaphragm and the main valve assembly define a control chamber on an upper side thereof and an inlet region on a lower side thereof. The assembly also includes a discharge plug with a flange portion configured to be received in the plug opening in the discharge receiver. When the flush valve assembly is in a non-pressurized condition, the flange portion of the discharge plug is not seated within the plug opening of the discharge receiver, and when the flush valve assembly is in a pressurized condition, the flange portion of the discharge plug is seated within the plug opening of the discharge receiver. The flushing operation may be electronic and/or manual.

18 Claims, 10 Drawing Sheets

U.S. PATENT DOCUMENTS

| | | |
|---|---|---|
| 6,000,674 A | 12/1999 | Cheng |
| 6,019,343 A | 2/2000 | Tsai |
| 6,041,809 A * | 3/2000 | Johnson .................... 137/247.25 |
| 6,349,921 B1 | 2/2002 | Jahrling |
| 6,382,586 B1 | 5/2002 | Wilson et al. |
| 6,560,790 B2 | 5/2003 | Saar et al. |
| 6,659,420 B2 | 12/2003 | Hwang et al. |
| 6,845,524 B2 | 1/2005 | Hwang |
| 6,860,282 B2 | 3/2005 | Guler |
| 6,874,535 B2 | 4/2005 | Parsons et al. |
| 6,923,424 B2 | 8/2005 | Maercovich et al. |
| 6,948,697 B2 | 9/2005 | Herbert et al. |
| 6,974,114 B2 | 12/2005 | Hwang |
| 7,000,889 B2 | 2/2006 | Kah, Jr. et al. |
| 7,028,975 B2 * | 4/2006 | Lee et al. ......................... 251/26 |
| 7,083,156 B2 | 8/2006 | Jost et al. |
| 7,124,997 B2 | 10/2006 | Wilson et al. |
| 7,188,822 B2 | 3/2007 | Marcichow et al. |
| 7,232,106 B2 | 6/2007 | Kah, Jr. et al. |
| 7,325,781 B2 | 2/2008 | Parsons et al. |
| 2005/0283897 A1 | 12/2005 | Hwang |
| 2006/0010591 A1 | 1/2006 | Bush |
| 2006/0143810 A1 | 7/2006 | Maercovich et al. |
| 2007/0034258 A1 | 2/2007 | Parsons et al. |
| 2009/0039299 A1 | 2/2009 | Wilson |

OTHER PUBLICATIONS

Written Opinion of the International Searching Authority for corresponding PCT Application No. PCT/US2010/057856, mailed Feb. 2, 2011.

* cited by examiner

ELECTRONIC FLUSH VALVE WITH OPTIONAL MANUAL OVERRIDE

The present invention relates generally to a flush valve. More particularly, embodiments of the invention relate to a flush valve with a venting configuration that does not rely on a flex venting tube to vent the control chamber, as some flush valves do. Embodiments of the invention also relate to a flush valve in which the flushing operation is electronically activated and/or manually activated.

BRIEF SUMMARY OF THE INVENTION

More specifically, embodiments of the present invention provide a flush valve assembly that includes an upper housing and a lower housing that is sealingly attached to the upper housing. Preferably, there is a discharge receiver seated within the upper housing, where the discharge receiver includes a plug opening. In addition, in preferred embodiments, a sleeve is seated within the lower housing, a main valve assembly is positioned within the sleeve, and a main diaphragm is sealingly connected between the main valve assembly and the sleeve. The main diaphragm and the main valve assembly, in combination, preferably define a control chamber on an upper side thereof and an outlet region on a lower side thereof.

Further, certain embodiments include a flow insert positioned within the main valve assembly, and a discharge plug sealingly connected to an upper portion of the flow insert. The discharge plug preferably includes a flange portion configured to be received in the plug opening in the discharge receiver. Embodiments may also include a second diaphragm that sealingly connects the flow insert and the discharge plug with the main valve assembly, and a flow restriction assembly that is associated with the main valve assembly, whereby the flow restriction assembly permits fluid from the inlet region to gradually enter the control chamber until pressure is equalized between the inlet region and the control chamber.

In the preferred embodiments, when the flush valve assembly is in a non-pressurized condition, the flange portion of the discharge plug is not seated within the plug opening of the discharge receiver, and when the flush valve assembly is in a pressurized condition, the flange portion of the discharge plug is seated within the plug opening of the discharge receiver.

In addition, embodiments of the invention also relate to a system for venting a control chamber of a flush valve assembly. Such a system can include a discharge receiver including a plug opening, a first venting opening and a second venting opening, where the first and second venting openings function to vent the control chamber to an inlet region during a flushing operation. In addition, the system may also include a discharge plug that seals the plug opening when the flush valve is in a pressurized condition. Finally, such a system may also include an electronic solenoid that is configured and arranged to open the first venting opening during an electronic flushing operation and to close the first venting opening otherwise, and a manual override assembly that is configured and arranged to the said second venting opening during a manual flushing operation and to close the second venting opening otherwise.

BRIEF DESCRIPTION OF THE DRAWINGS

Preferred embodiments of the present invention are described herein with reference to the drawings wherein.

DETAILED DESCRIPTION OF THE INVENTION

Figure 1:
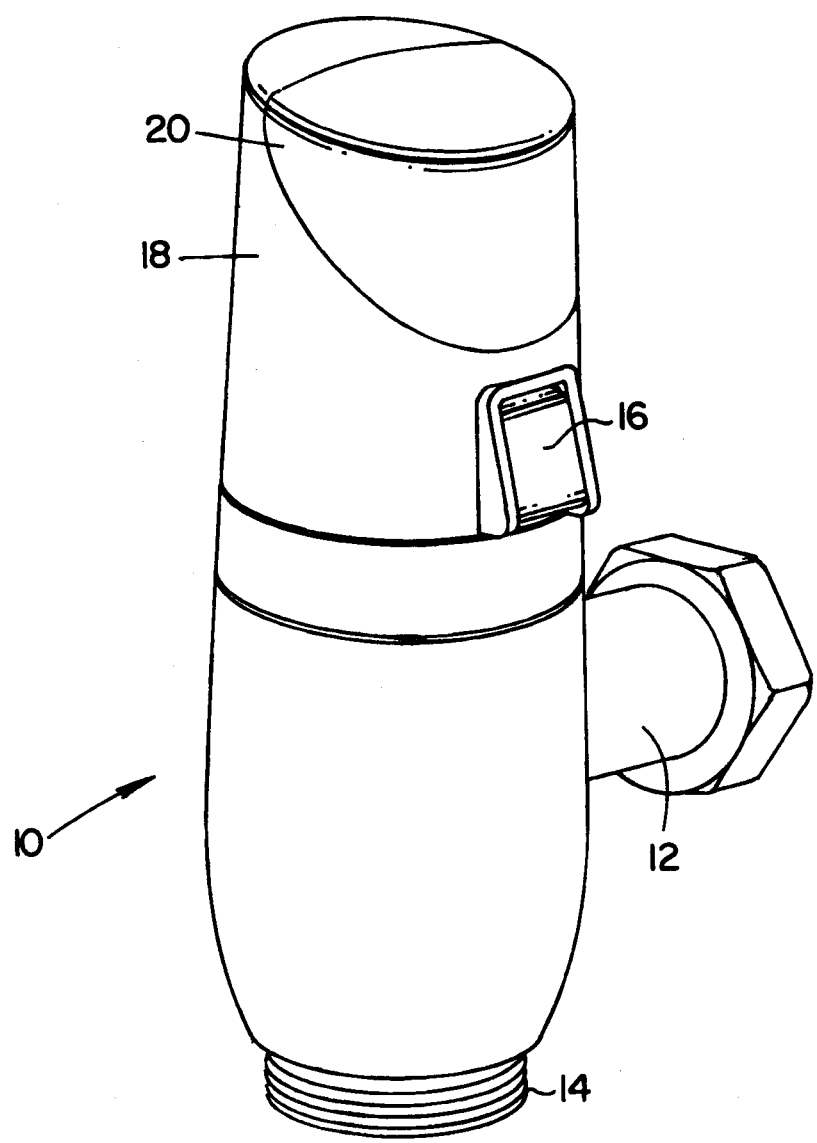
FIG. 1 is a front perspective view of the exterior of an embodiment of a flush valve assembly of the present invention.

Turning now to the drawings, embodiments of the present flush valve will be shown and described. FIG. 1 is an external, perspective view of one embodiment of an flush valve 10 of the present invention, which is attached between an inlet pipe 12 and an outlet pipe (not shown) at outlet connecting region 14. As known to those of ordinary skill in the art, inlet pipe 12 receives water from the building's water supply, and outlet connecting region 14 is attached to the inlet of a urinal or toilet. Flush valve 10 provides the flushing action for the associated urinal/toilet when the valve is activated by allowing a predetermined amount of water to pass from the inlet pipe 12, through the valve 10, and into the urinal/toilet.

In this embodiment, the flushing action may be activated electronically, such as with the use of a light sensor, as known in the art, or manually, through the use of manual flush button 16. Of course, it is also contemplated that flush valve 10 could be electronically activated only or manually activated only, instead of including components for both electronic activation and manual activation.

In this embodiment, flush valve 10 includes a cover 18, with a translucent window 20 for allowing passage of the light beam of the sensor. Of course, other cover configurations may also be used, and window 20 may be omitted if a light sensor is not used.

Figure 2:
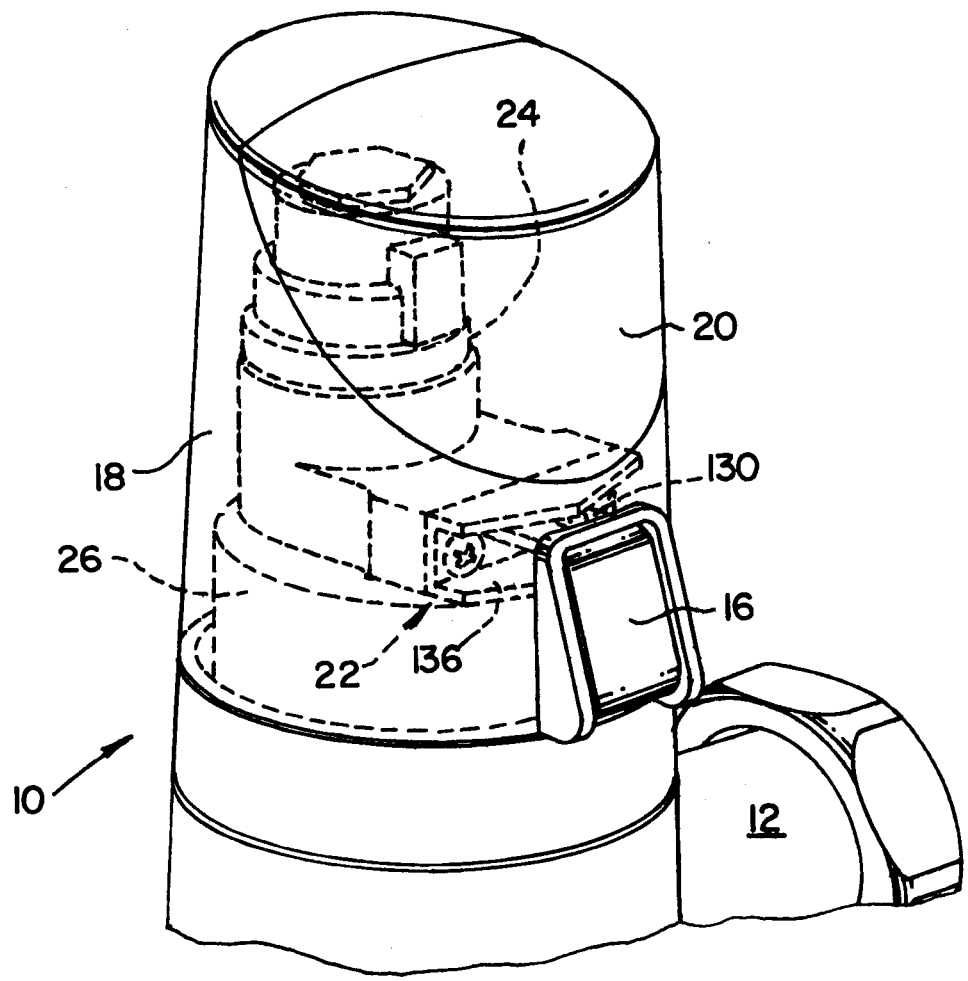
FIG. 2 is a close-up view of the upper portion of the flush valve of FIG. 1, shown with a transparent cover.

Turning now to FIG. 2, cover 18 is preferably entirely translucent, or even transparent, in order to allow the internal components to be seen in this view. For example, this view shows how the manual flush button 16 is part of a manual override assembly 22, which will be explained more fully below. This view also shows an example of a solenoid 24, which is used to control water flow during electronic operation. Use of solenoids for this purpose is known in the art, such as described in U.S. Pat. No. 5,244,179 to John R. Wilson, which is hereby incorporated by reference in its entirety.

Figure 3:
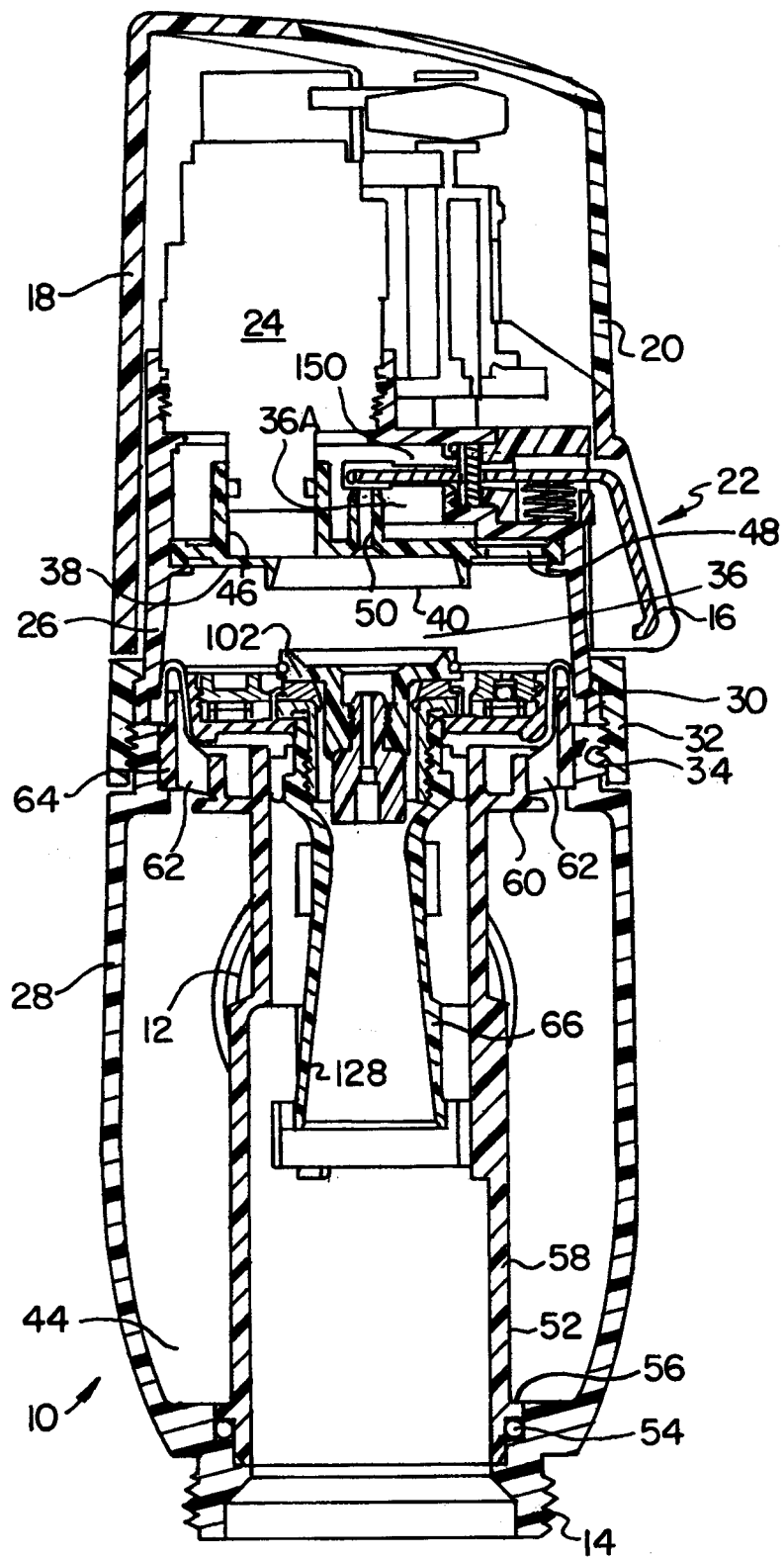
FIG. 3 is a cross-sectional view of the flush valve assembly of FIG. 1, shown at rest, before pressurization.

FIG. 3 shows a cross-sectional view of the flush valve assembly 10 of FIG. 1, including an upper housing 26 attached to a lower housing 28 in a sealed manner. In this embodiment, the upper housing 26 includes a shoulder 30 upon which is seated an internally threaded collar 32 that is configured and arranged to mate with external threads 34 on lower housing 28. Other housing configurations are also contemplated, such as one in which internally threaded collar 32 is unitarily formed as part of upper housing 26.

The FIG. 3 view shows the valve assembly 10 in an at rest state, prior to being pressurized, such as after first being installed or after maintenance has been performed. In this unpressurized state (i.e., where no fluid pressure is being applied through inlet pipe 12 because such fluid flow has been turned off), there is no fluid in control chamber 36, so an operator can remove the upper housing 26, and its associated components, for repair or to perform routine maintenance on any of those components.

Figure 8:
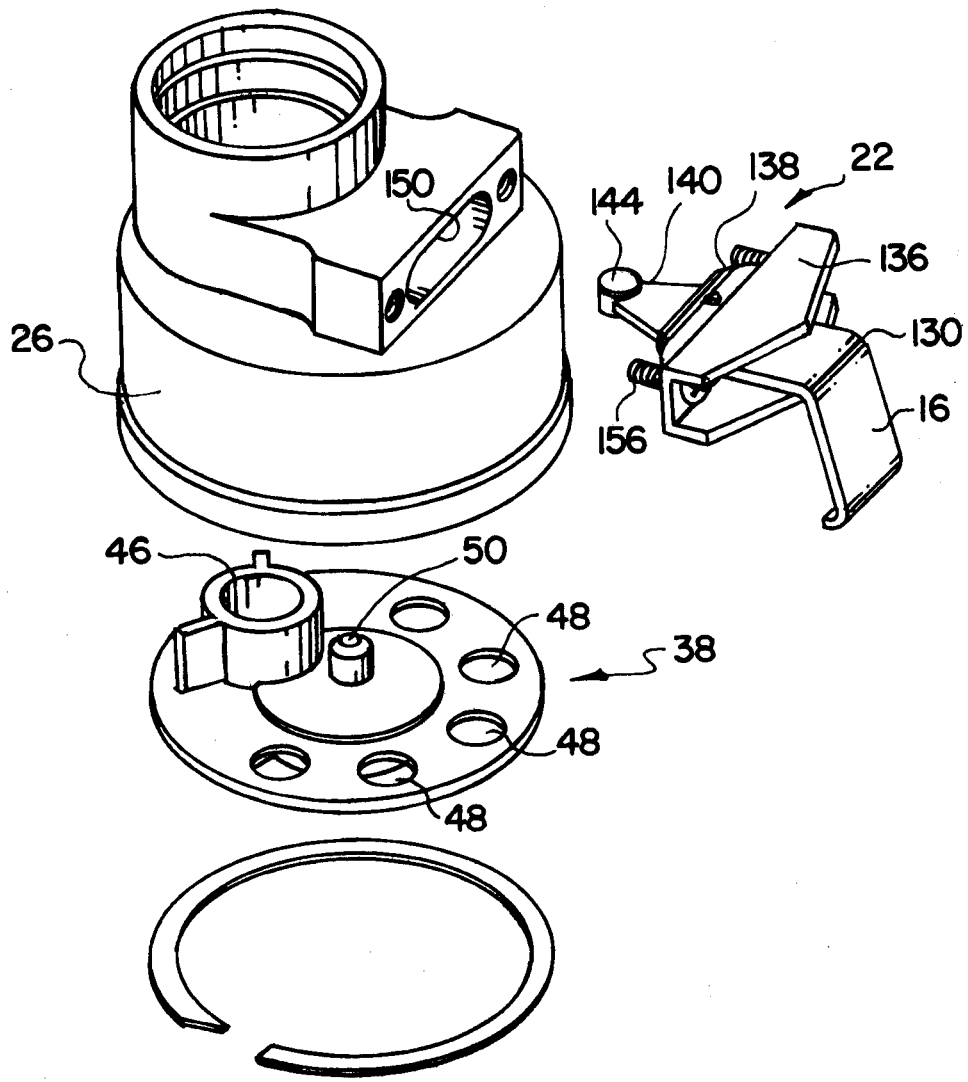
FIG. 8 is an exploded view of the discharge receiver, the upper housing, and the associated components of the flush valve assembly of FIG. 1.

Towards the upper portion of the control chamber 36, a discharge receiver 38 is securely seated within the upper housing 26. The discharge receiver 38 includes a plug opening 40, which is preferably slightly conical, and which is configured to sealingly receive a flange portion of a discharge plug 102 after inlet region 44 has been pressurized, as explained more fully below. The discharge receiver 38 also includes a solenoid opening 46 (or first venting opening), where solenoid 24 is sealingly attached. Additionally, the discharge receiver 38 also includes a plurality of flow through apertures 48 (see also FIG. 8), which allow fluid to flow between the main portion of the control chamber 36 and the upper portion 36A of the control chamber. Finally, the discharge receiver 38 of this embodiment also includes a manual override opening 50 (or second venting opening), which is associated with the manual override assembly 22, as explained more fully below.

Located within the lower housing 28 is a sleeve 52. As can be seen in FIG. 3, the lower end of sleeve 52 is sealingly attached to a shoulder on the lower housing 28 via an o-ring 54 that is seated below an annular projection 56. Of course, other means of sealingly attaching the bottom of the sleeve 52 and the lower housing 28 are also contemplated as being within the scope of the invention, such as by capturing an o-ring between upper and lower annular projections extending outwardly from sleeve 52.

Figure 4:
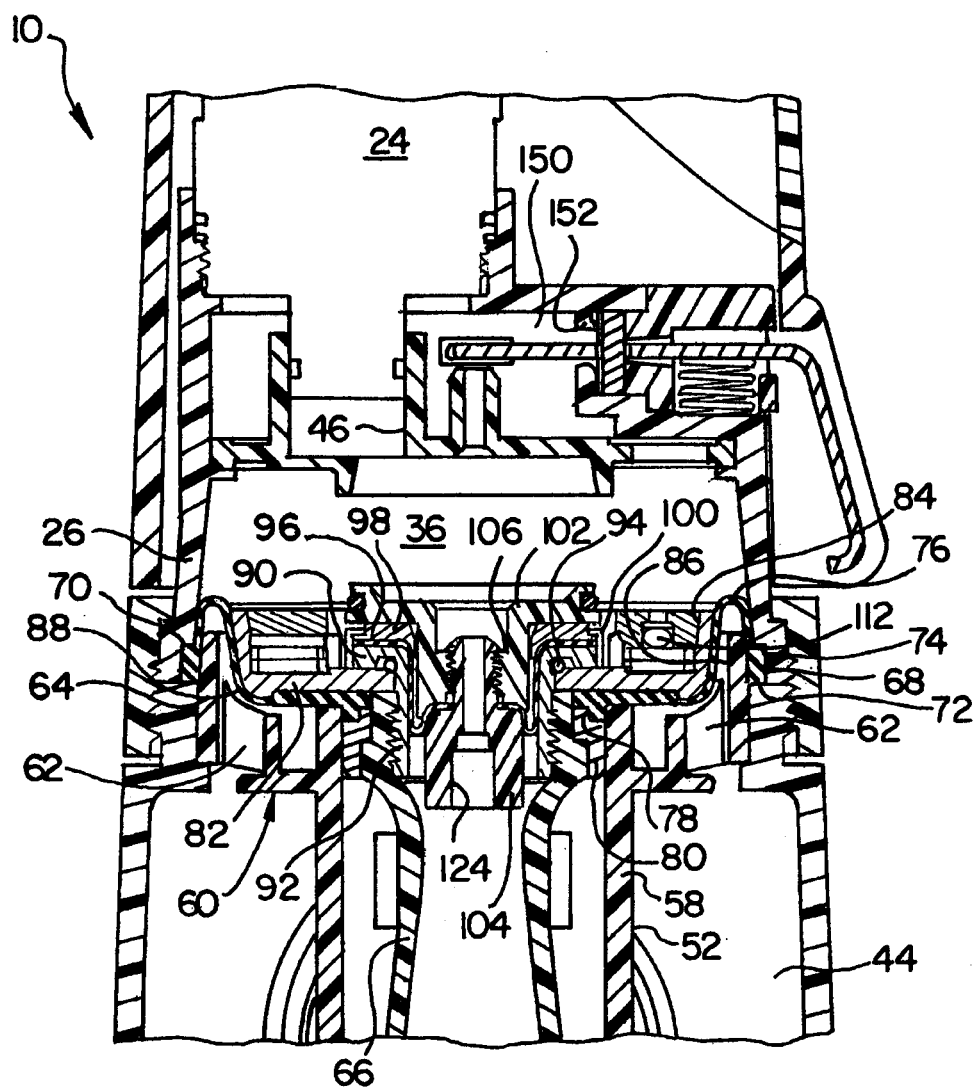
FIG. 4 is a close-up view of the upper portion of FIG. 3.
Figure 5:
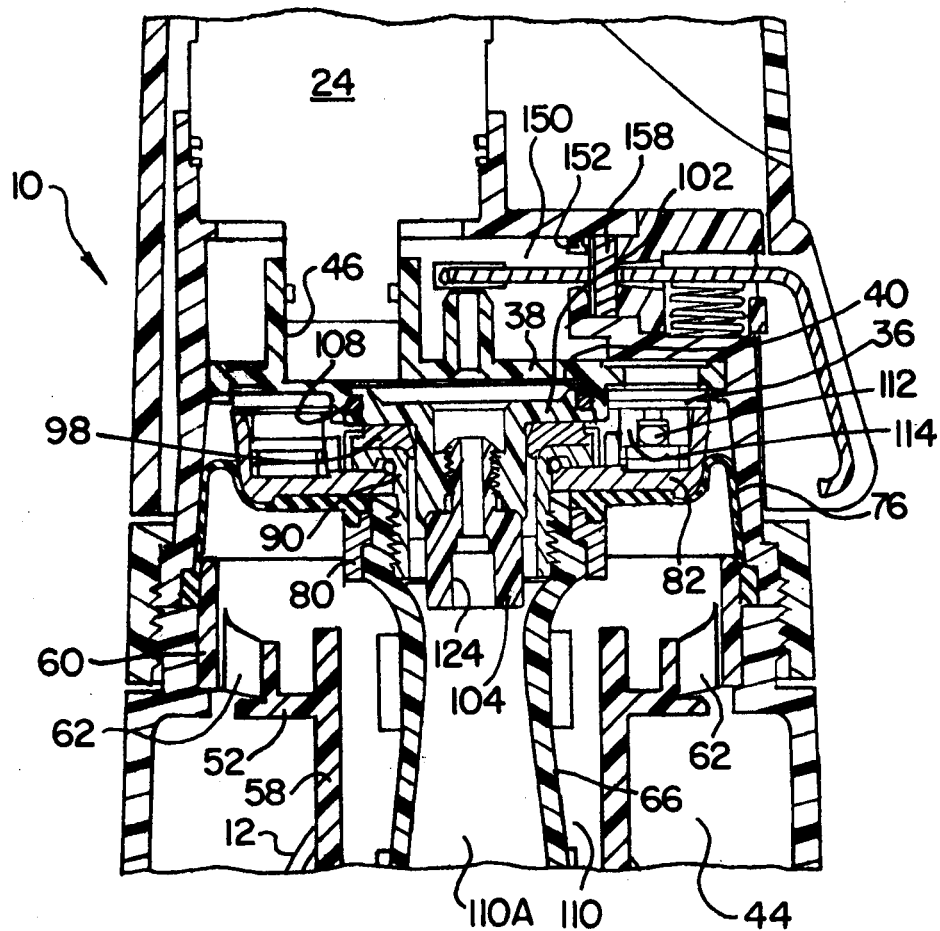
FIG. 5 is a close-up, cross-sectional view of the upper portion of the flush valve assembly of FIG. 1, shown under pressure in the full open state.

A main valve 66 is seated within the sleeve 52. As explained below, the main valve 66 is free to move axially upwardly within the sleeve 52 from the FIG. 3 position to a position such as that shown in FIG. 5, where FIG. 5 shows a state where the valve is pressurized and in the fully open position. Sleeve 52 can be considered to include two main portions: a lower tube-like portion 58 and an upper collar portion 60. Upper collar portion 60 includes a plurality of openings 62 and an exterior collar 64, as shown in FIG. 4, which is a close-up of a portion of FIG. 3.

Continuing to view FIG. 4, the components near the upper collar portion 60 of the upper portion of sleeve 52 will be discussed. In this embodiment, exterior collar 64 includes an annular indented portion 68, which, combined with a cooperating annular recessed portion 70 on the upper housing 26 and an upper surface 72 of the lower housing 28, form an annular chamber for sealingly receiving an outer radial perimeter 74 of a main (or outer) diaphragm 76. The inner radial perimeter 78 of the main diaphragm 76 is sealingly seated between a flow restriction ring 80, which sits on an annular ledge on the main valve 66, and a disk member 82. As can be seen in FIG. 4, the disk member 82 sits upon the uppermost surface of the main valve 66, and includes a radially outer annular wall 84 that has an outer peripheral surface that is shaped to correspond to the radially inner surface 86 of the upper collar portion 64, with an intermediate portion 88 of the main diaphragm 76 located therebetween.

To maintain the disk member 82 in position upon the main valve 66, an upper retaining ring 90 is provided in this embodiment. The upper retaining ring 90 preferably includes external threads 92 that mate with internal threads on the main valve 66. An o-ring 94, or other seal member, is preferably provided within an annular pocket to seal the interface between the upper retaining ring 90 and the main valve 66.

One of the features of this embodiment of the invention is that it includes two diaphragms. Thus, in addition to the main (or outer) diaphragm 76, there is also a second, or inner, diaphragm 96, which is seated above the upper retaining ring 90. The outer periphery of the inner diaphragm 96 is sealingly attached to the upper retaining ring 90 by inner diaphragm retaining ring 98, which, in this embodiment, is secured to the upper retaining ring by a cooperating tab arrangement 100.

The inner periphery of the inner diaphragm 96 is preferably seated between the discharge plug 102 and a flow insert 104. The discharge plug 102 and the flow insert 104 are preferably secured together via mating threads 106, which enable the inner periphery of the inner diaphragm 96 to be sealingly maintained between these two components. However, other means of connecting the discharge plug and the flow insert are also contemplated.

As mentioned above, the state shown in FIGS. 3 and 4 is one in which the valve is shown at rest, prior to pressurization. Thus, in this state, there is no fluid within the control chamber 36. Also, in this state, the main valve assembly (including the main valve 66, the flow restriction ring 80, the disk member 82, the upper retaining ring 90 and the inner diaphragm retaining ring 98) and the flow insert/discharge plug (104/102) assembly are both positioned at their lowermost positions within the sleeve 52, as can be seen in FIGS. 3 and 4.

Turning now to FIG. 5, the pressurized, full-open state will be discussed. In this state, high pressure fluid has entered the inlet region 44 from the inlet pipe 12 (see also FIGS. 1 and 2). The fluid has also passed from the inlet region 44 through the openings 62 in the sleeve 52. Fluid pressure has acted upon the lower surface of the main diaphragm 76, thereby pushing the associated components upwardly and away from the sleeve 52. More specifically, fluid pressure on the main diaphragm 76 lifts the disk member 82 and the main valve 66 attached thereto, as well as the discharge plug 102 and the attached flow inert 104, which are seated within the main valve 66. In this state, the discharge plug 102 engages the plug opening 40 of the discharge receiver 38, as can be seen in FIG. 5. An o-ring 108, or other sealing member, is preferably provided within an annular recess at the interface between the plug opening 40 and the discharge plug 102 to seal between these two components. As can be seen in the figures, the discharge plug 102 includes a flange portion and an axially extending portion. As mentioned above, the plug opening 40 is preferably slightly conical, and in addition, the corresponding surface of the flange portion of the discharge plug 102 is also slightly conical in a complementary manner in order to facilitate entry of the plug into the plug opening. With this seal (such as o-ring 108) at the interface between discharge plug 102 and the plug opening 40, in combination with the seals at the inner and outer peripheries of the main diaphragm 76 and the seal at the inner periphery of the disk member 82, the control chamber 36 is essentially sealed off from the low pressure outlet region 110/110A, except for the controlled, restricted flow discussed next.

Figure 6:
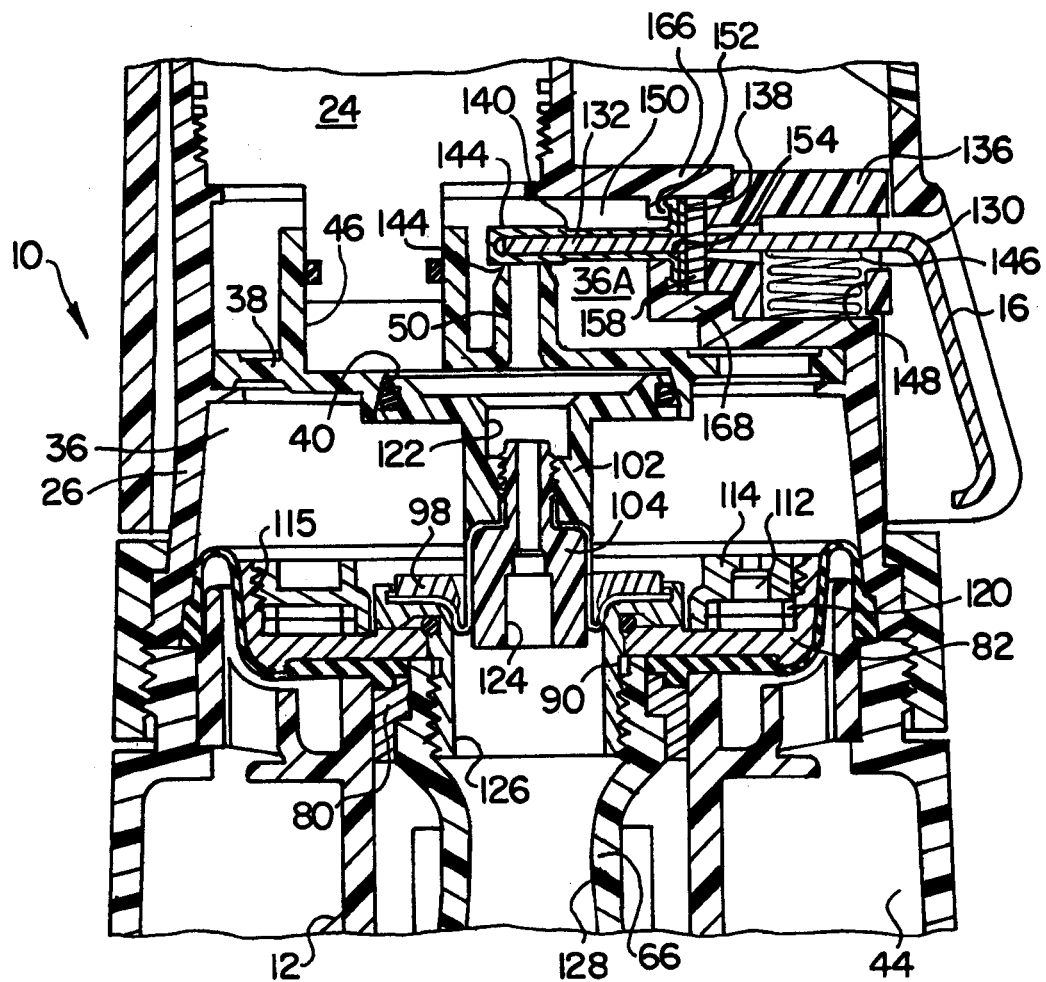
FIG. 6 is a close-up, cross-sectional view of the upper portion of the flush valve assembly of FIG. 1, shown under pressure in the timed closed state.

While in the FIG. 5 state, fluid slowly flows through a flow restriction device 112, that is associated an optional screen filter ring 114, and into the control chamber 36 until reaching the standby, closed position of FIG. 6. The screen filter ring 114 may be secured to disk member 82 by any known means, such as by cooperating notches or by the cooperating threads 115 shown in FIGS. 6 and 7.

One benefit of the embodiments of the present design is that the main diaphragm is allowed to move freely back and forth between its open (FIG. 5) and closed (FIG. 6) states while staying sealed to a statically positioned vent that vents though the main diaphragm without adding any friction or spring bias, both of which could influence the movement of the main diaphragm in a negative way.

Figure 7:
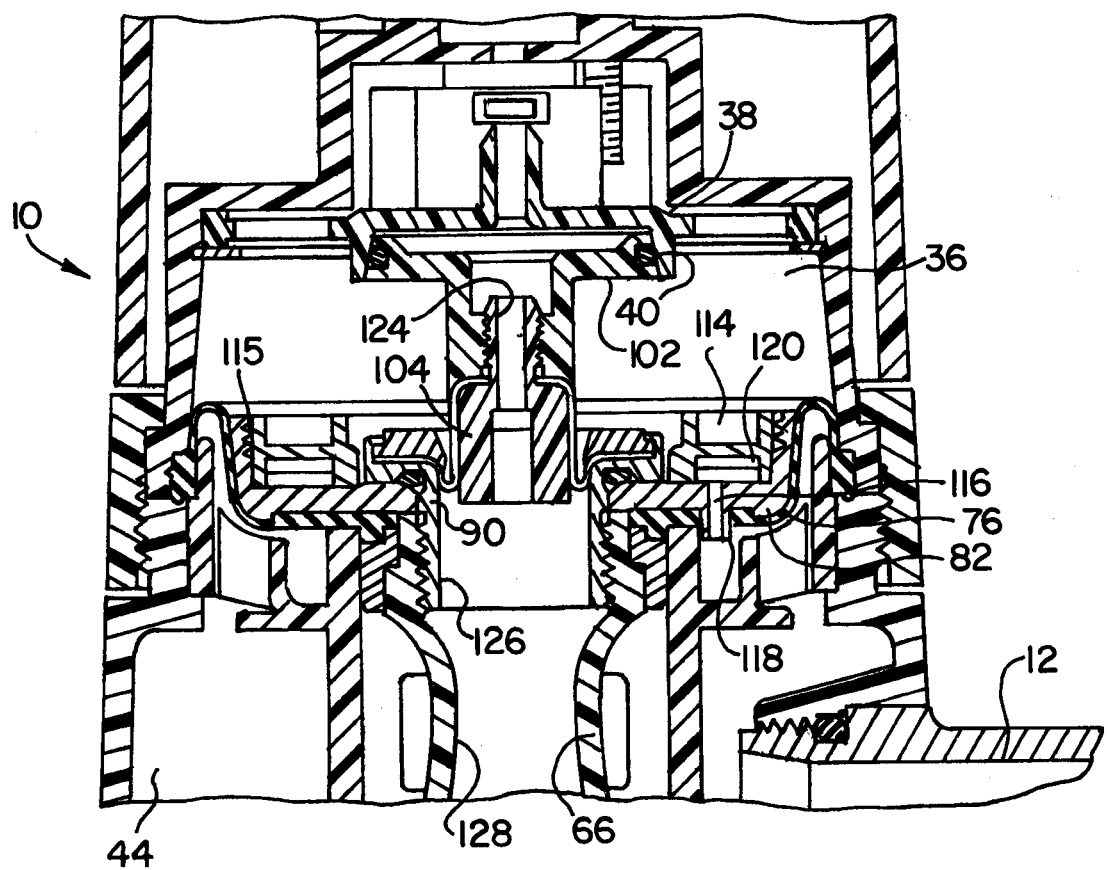
FIG. 7 is another close-up view of the upper portion of FIG. 6, shown rotated 90 degrees from the FIG. 6 view.

Next, additional details of such controlled flow via the flow restriction assembly will be explained, while referring to FIG. 6 and to FIG. 7, where FIG. 7 shows the valve assembly in the same state as the FIG. 6 view, except that in the FIG. 7 view, the assembly is rotated by 90°. As can be seen in the FIG. 7 view, the disk member 82 includes at least one duct 116, which is aligned with an aperture 118 in the main diaphragm 76, to thereby allow fluid to pass into the control chamber 36 (after passing through at least one preferably annular screen filter 120, if included) and the flow restriction device 112 (FIG. 6). As can be seen by comparing FIGS. 6 and 7, the duct 116 (FIG. 7) is preferably offset from the flow restriction device 112 (FIG. 6), which helps to better distribute pressure fields at the restriction device item 112, thereby promoting a consistent and repeatable flow into the control chamber 36 until pressure is equalized between the control chamber and the inlet region 44, at which point the flow into the control chamber stops.

Once the control chamber 36 is completely filled (i.e., pressure has been equalized), the disk member 82 and its associated components will be in the lowermost position, as shown in FIGS. 6 and 7. Additionally, the discharge plug 102 and the flow insert 104 will be in their uppermost position, within plug opening 40 of discharge plug 38, as also shown in FIGS. 6 and 7. The valve assembly 10 will remain in the state of FIGS. 6 and 7 until a flushing operation is initiated, or until pressure to the valve is discontinued, such as for maintenance.

As mentioned above, the present flush valve may be flushed electronically, or it may optionally include a manual flushing mechanism. Electronic flush activation will be discussed first, followed by manual flush.

Starting from the state of FIG. 6, an electronic flushing operation is initiated by a sensor which sends a flushing signal to the solenoid 24, in any manner known to those of ordinary skill in the art. Once the electronic flushing operation is initiated, the solenoid 24 allows fluid to flow from the control chamber 36 and 36A, through the solenoid opening 46 (i.e., the first venting opening), into a discharge plug opening 122 in the discharge plug 102, then into a flow insert opening 124 in the flow insert 104. From here the fluid travels through a central aperture 126 of the upper retaining ring 90, and then into a main opening 128 of the main valve 66. As can be seen in FIG. 3, after passing through the main opening 128 of the main valve 66, the fluid passes through the sleeve 52 and through the outlet connecting region 14, where it continues to the associated toilet or urinal to perform the flushing operation, in combination with additional fluid entering from inlet pipe 12 that also passes through sleeve 52 via openings 62 (FIG. 5). Venting chamber 36/36A forces pressure in inlet region 44 to open the main diaphragm valve thereby providing the bulk of water flow of the flush cycle. Such vented fluid flow continues until the solenoid is shut off. Once shut off, pressure in control chamber 36 and 36A recovers from the restricted flow through flow restriction device 112 until the main valve assembly is in the closed state of FIG. 6.

Next, the optional manual flushing mechanism and the manual flush operation will be discussed while referring primarily to FIGS. 2, 6 and 8-10. The manual override assembly 22 of this embodiment includes the manual flush button 16, which is part of a pivotable lever 130. The pivotable lever 130 is preferably generally L-shaped, and it includes a tongue portion 132 on the end opposite from the flush button 16. The pivotable lever 130 is positioned within a slot 134 (FIG. 10) formed in a lever housing 136. When assembling the manual override assembly 22, an appropriately shaped washer 138 is preferably positioned adjacent the slot 134, and the tongue portion 132 of the lever 130 is inserted through the slot 134 and the washer 138 and then into a flexible static seal member 140, which is preferably made of an elastomeric material.

Figure 9:
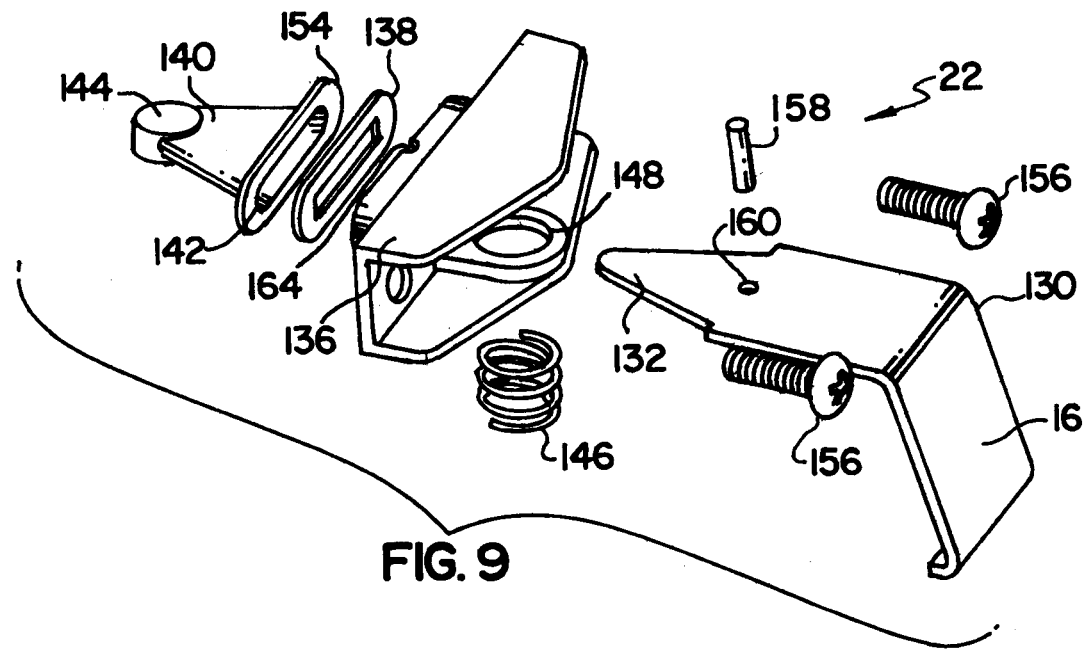
FIGS. 9 and 10 are exploded views of the components of the manual override assembly of the flush valve assembly of FIG. 1, shown from two different angles.

As best shown in FIG. 9, the flexible static seal member 140 is preferably generally triangular shaped so that it corresponds to the shape of tongue portion 132, and it includes an opening 142 for receiving the tongue portion into an envelope portion. The distal end of the seal member 140 preferably includes a slightly thickened circular portion 144, on both the top and bottom thereof, that is configured and arranged to contact and sealingly close the top of the manual override, or second venting, opening 50, shown in FIGS. 6 and 8. The seal member 140 is preferably symmetric, with respect to the horizontal plane, as well as along an axial centerline when viewed from above or below, to avoid possible inverted installation. However, it is also contemplated that the circular portion could be made on only one face of the seal member 140, which face would be the one that makes contact with opening 50. Such a configuration would need to be installed in the proper orientation.

Figure 10:
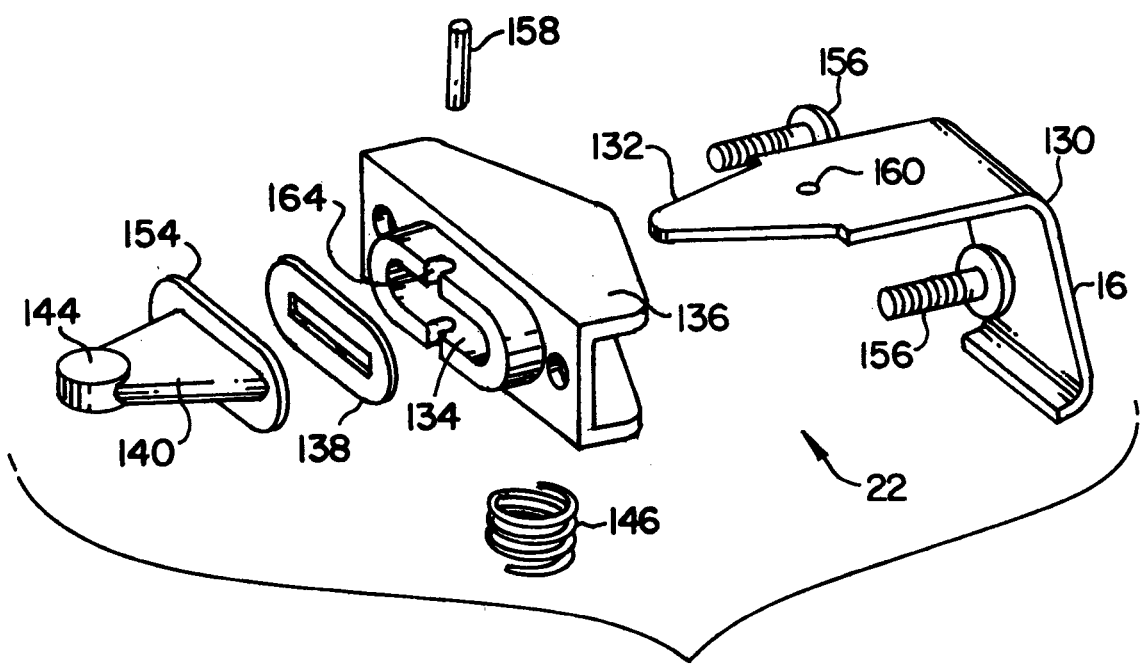

As shown in FIGS. 6, 9 and 10, the manual override assembly 22 also includes a biasing member, such as a coil spring 146, which is configured to be seated within a spring opening 148 formed in the lever housing 136. The spring 146, or other biasing member, biases the button side (near button 16) of the pivotable lever 130 upwardly with respect to a pivot point defined within the slot 134 of the lever housing 136. Thus, with such an upward bias, as shown in FIG. 6, the tongue portion 132 of the lever 130, with the seal member 140 attached thereon, makes the seal member 140 come into contact the upper end of the manual override opening 50, thereby enabling the circular portion 144 of the seal member 140 to seal and close the opening 50.

In the embodiment shown in the figures, the manual override assembly 22 is attached to a portion of the upper housing 26. More specifically, the upper housing 26 preferably includes a socket 150, such as shown in FIG. 6, which surrounds the tongue portion 132 that is encased by the static seal member 140. There is preferably a sill 152 at the entrance to the socket 150. A lip 154 of the static seal member 140 is compressed between the sill 152 and the lever housing 136 (with the washer 138 also interposed therebetween). Such a configuration provides a seal at this area when the lever housing 136 is attached to the upper housing 26, which, in this embodiment, is accomplished through the use of screws 156 (see, e.g., FIGS. 8-10).

FIGS. 9 and 10 also show how this embodiment includes a pin 158, which is configured to be received within a pin hole 160 formed in the pivotable lever 130. After the tongue portion 132 of the pivotable lever 130 is inserted into the slot 134 of the lever housing 136, the pin 158 can be inserted into the pin hole 160. A pin slot 164 in the lever housing 136 maintains the pin 138 in position between lever housing 136 and the washer 138, with respect to the horizontal direction, so that the pivotable lever 130 does not become separated from the reminder of the manual override assembly 22. As can be seen in FIG. 6, the socket 150 of the upper housing 26 preferably includes an upper wall 166 and a lower wall 168, which help to maintain the pin 138 in position with respect to the vertical direction.

When the manual flushing operation is desired, the user simply applies pressure to the manual flush button 16, which causes the pivotable lever 130 to pivot, against the force of the spring 146, so that the tongue portion 132 of the pivotable lever 130 moves upward. Such action causes the lower circular portion 144 of the flexible static seal member 140 to move out of sealing contact with the manual override opening 50 (i.e., the second venting opening) of the discharge receiver 38. Accordingly, fluid from the upper control chamber 36A flows through the manual override opening 50 and into the discharge plug opening 122 in the discharge plug 102.

At this point, the fluid flow of the flush process is the same as described above with respect to the electronic flushing operation. That is, the fluid then flows into the flow insert opening 124 in the flow insert 104. From here the fluid travels through the central aperture 126 of the upper retaining ring 90, and then into the main opening 128 of the main valve 66. As can be seen in FIG. 3, after passing through the main opening 128 of the main valve 66, the fluid passes through the sleeve 52 and through the outlet connecting region 54, where it continues to the associated toilet or urinal to perform the flushing operation. The venting results in the main diaphragm being forced open, as shown in FIG. 5, which provides the bulk of the water flow for the flush. Such fluid flow continues until the manual override assembly 22 is released and allowed to seal the vent, at which point the fluid pressure in the inlet region 44, which passes through the flow restriction device 112, refills the control chamber 36, which returns the valve assembly to the closed state of FIG. 6.

Figure 11:
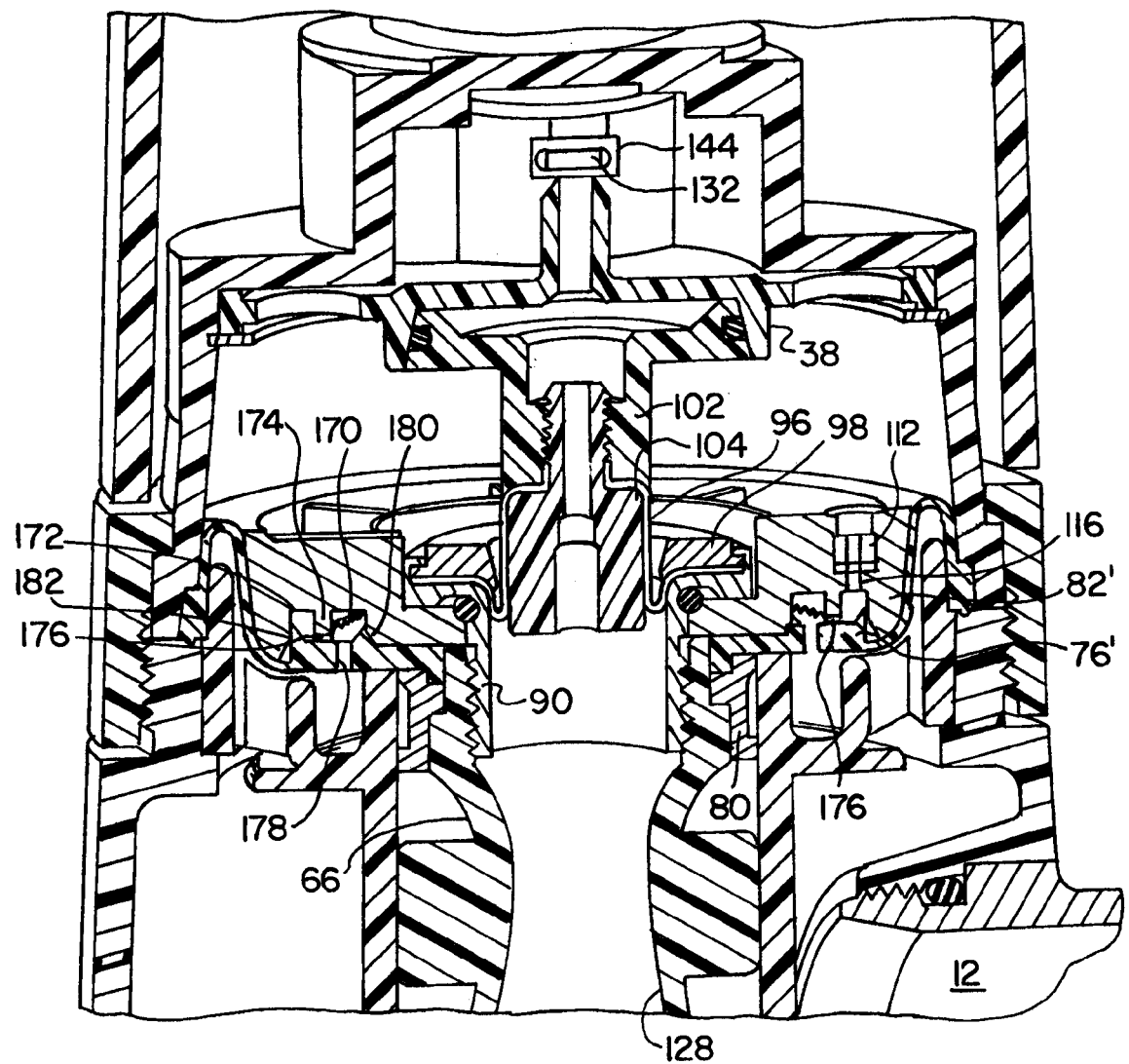
FIG. 11 is a close-up, cross-sectional view of the upper portion of a flush valve assembly of an embodiment of the present invention that lacks a screen filter and the related components.

Turning now to FIG. 11, an alternative embodiment of the present invention will be briefly described. The FIG. 11 embodiment is essentially the same as the embodiment previously described, except that it lacks the screen filter and the components associated with the screen filter. Due to the similarities between the FIG. 11 embodiment and the embodiment previously described, like components will be assigned the same reference numbers, and the discussion of such like components need not be repeated here.

In the FIG. 11 embodiment, the disk member 82' is different from the disk member 82 of the previous embodiment, and the main diaphragm 76' of FIG. 11 is also different from the main diaphragm 76 of the previous embodiment. More specifically, since the FIG. 11 embodiment has no screen filter, it also lacks the screen filter ring 114 of the previous embodiment (such as shown in FIG. 6). Thus, in the FIG. 11 embodiment the flow restriction device 112 is seated within an aperture in the disk member 82', instead of in a screen filter ring. In order to accommodate flow restriction device 112, the disk member 82' has an axial thickness that is greater than disk member 82 of the previous embodiment.

The bottom surface of the disk member 82' of the FIG. 11 embodiment also includes an inner annular channel 170 and an outer annular channel 172. A wall 174 is provided to separate the inner annular channel 170 from the outer annular channel 174. The wall 174 preferably includes a plurality of slots 176 along the entire bottom surface thereof. Thus, in the FIG. 11 embodiment, fluid flows from the flow restriction device 112, through the duct 116, and into the outer annular channel 172. Then, the fluid flows through the slots 176, which extend in a generally radial direction, and into the inner annular channel 170. From the inner annular channel 170, the fluid flows through axially extending ports 178 in the main diaphragm 76'. Other than the flow path just described, the operation of the FIG. 11 embodiment is essentially the same as that of the other embodiment.

As mentioned above, the main diaphragm 76' includes a plurality of ports 178, which is one difference between main diaphragm 76' of the FIG. 11 embodiment and diaphragm 76 of the earlier embodiment. Another difference is that main diaphragm 76' includes a pair of annular lips, such as inner annular lip 180 and outer annular lip 182. The inner annular lip 180 seals against the inner wall of the inner annular channel 170, and the outer annular lip seals against the outer wall of the outer annular channel 172, thereby limiting the exit route of the fluid to ports 178. Other than the differences just described, the main diaphragm 76' of the FIG. 11 embodiment is essentially the same as the main diaphragm 76 of the earlier embodiment. Although only one embodiment without the screen filter has been shown and described, it is contemplated that different components, or variations on the components described, could also be utilized, and still be within the scope of the invention.

While various embodiments of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A flush valve assembly comprising:
   an upper housing;
   a lower housing sealingly attached to said upper housing;
   a discharge receiver seated within said upper housing, said discharge receiver including a plug opening;
   a sleeve seated within said lower housing;
   a main valve assembly positioned within said sleeve;
   a main diaphragm sealingly connected between said main valve assembly and said sleeve, whereby said main diaphragm and said main valve assembly, in combination, define a control chamber on an upper side thereof and an inlet region on a lower side thereof;
   a flow insert positioned within said main valve assembly;
   a discharge plug sealingly connected to an upper portion of said flow insert, said discharge plug including a flange portion configured to be received in said plug opening in said discharge receiver;
   a second diaphragm, secured between said flow insert and said discharge plug, for sealingly connecting said flow insert and said discharge plug with said main valve assembly; and
   a flow restriction assembly associated with said main valve assembly, whereby said flow restriction assembly permits fluid from said inlet region to gradually enter said control chamber until pressure is equalized between said inlet region and said control chamber;
   wherein when said flush valve assembly is in a non-pressurized condition, said flange portion of said discharge plug is not seated within said plug opening of said discharge receiver; and
   wherein when said flush valve assembly is in a pressurized condition, said flange portion of said discharge plug is seated within said plug opening of said discharge receiver.

2. The flush valve assembly according to claim 1, wherein during the pressurized condition, the main valve assembly is configured and arranged to be in any one of multiple different states, including a closed state and an open state.

3. The flush valve assembly according to claim 2, wherein:
during said closed state, under the pressurized condition, said main valve assembly is positioned in its lowermost position within said sleeve; and
during said open state, under the pressurized condition, said main valve assembly is positioned in its uppermost position.

4. The flush valve assembly according to claim 3, wherein said main valve assembly comprises:
a main valve;
a disk member;
an upper retaining ring, wherein said upper retaining ring aids in securing said disk member to said main valve; and
an inner diaphragm retaining ring that sealingly sandwiches an inner perimeter of said second diaphragm in cooperation with said upper retaining ring.

5. The flush valve assembly according to claim 3, further comprising a manual flushing assembly that is configured and arranged to allow fluid to pass from said control chamber, through said discharge plug and then through said sleeve during a manual flushing operation.

6. The flush valve assembly according to claim 1, further comprising a solenoid that is configured and arranged to allow fluid to pass from said control chamber, through said discharge plug and then through said sleeve during an electronic flushing operation.

7. The flush valve assembly according to claim 1, wherein:
said discharge plug includes a discharge plug opening extending therethrough, a flange portion and an axially extending portion;
said flow insert is secured within said discharge plug opening; and
said flow insert includes a flow insert opening extending therethrough.

8. The flush valve assembly according to claim 1, wherein:
said main diaphragm includes an inner radial perimeter that is sealingly attached to an outer portion of said main valve and an outer radial perimeter that is sealingly connected to an outer portion of said sleeve; and
said second diaphragm includes an inner radial perimeter that is sealingly attached to an outer portion of said flow insert and an outer radial perimeter that is sealingly connected to said main valve by being sandwiched between an upper retaining ring and an inner diaphragm retaining ring.

9. The flush valve assembly according to claim 1, wherein said sleeve further comprises:
an upper collar portion, with a plurality of openings therein; and
a lower tube-like portion that extends below the upper collar portion.

10. The flush valve assembly according to claim 1, further comprising a disk member positioned between said main diaphragm and said flow restriction assembly.

11. The flush valve assembly according to claim 10, wherein
said main diaphragm includes an aperture;
said disk member includes a duct that is axially aligned with said aperture of said main diaphragm; and
said flow restriction assembly comprises:
a screen filter ring that is seated upon said disk member;
a screen filter associated with a lower portion of said screen filter ring; and
a flow restriction device associated with an upper portion of said screen filter ring.

12. The flush valve assembly according to claim 11, wherein said flow restriction device is axially offset from said duct of said disk member and said aperture of said main diaphragm.

13. A flush valve assembly comprising:
an upper housing;
a lower housing sealingly attached to said upper housing;
a discharge receiver seated within said upper housing, said discharge receiver including a plug opening;
a sleeve seated within said lower housing;
a main valve assembly positioned within said sleeve;
a main diaphragm sealingly connected between said main valve assembly and said sleeve, whereby said main diaphragm and said main valve assembly, in combination, define a control chamber on an upper side thereof and an inlet region on a lower side thereof;
a flow insert positioned within said main valve assembly;
a discharge plug sealingly connected to an upper portion of said flow insert, said discharge plug including a flange portion configured to be received in said plug opening in said discharge receiver;
a second diaphragm sealingly connecting said flow insert and said discharge plug with said main valve assembly; and
a flow restriction assembly associated with said main valve assembly, whereby said flow restriction assembly permits fluid from said inlet region to gradually enter said control chamber until pressure is equalized between said inlet region and said control chamber;
wherein when said flush valve assembly is in a non-pressurized condition, said flange portion of said discharge plug is not seated within said plug opening of said discharge receiver; and
wherein when said flush valve assembly is in a pressurized condition, said flange portion of said discharge plug is seated within said plug opening of said discharge receiver,
wherein said discharge receiver includes:
at least one venting opening for allowing fluid to flow through said discharge plug and said flow insert during a flushing operation; and
a plurality of flow through apertures for allowing fluid flow between a main portion of said control chamber and an upper portion of said control chamber.

14. A system for venting a control chamber of a flush valve assembly, comprising:
a discharge receiver including a plug opening, a first venting opening and a second venting opening, said first and second venting openings venting said control chamber to an outlet connecting region during a flushing operation, wherein said second venting opening is in fluid communication with said plug opening;
a discharge plug sealing said plug opening, when the flush valve is in a pressurized condition;
an electronic solenoid configured and arranged to open said first venting opening during an electronic flushing operation and to close said first venting opening otherwise, and
a manual override assembly configured and arranged to open said second venting opening during a manual flushing operation and to close said second venting opening otherwise, wherein during said manual flushing operation, fluid passes through both said second venting opening and said plug opening;
wherein said manual override assembly comprises:
a lever housing;

a lever configured and arranged to pivot about a pivot point within said lever housing, wherein said lever includes a first end on one side of said pivot point and a second end on an opposite side of said pivot point; and a biasing member for keeping said first end of said lever in sealing contact with said first venting opening unless a user, during said manual flushing operation, applies sufficient manual pressure to said second end of said lever to overcome a biasing force of said biasing member.

15. The system for venting a control chamber of a flush valve assembly according to claim 14, further comprising:

a flexible static seal attached to said first end of said lever, wherein said flexible static seal provides a seal between said control chamber and said lever housing.

16. The system for venting a control chamber of a flush valve assembly according to claim 15, wherein said flexible static seal comprises a lip portion and an envelope portion, whereby said first end of said lever extends into said envelope portion, and further wherein an outer surface of said envelope portion is configured and arranged to sealingly close said second venting opening.

17. The system for venting a control chamber of a flush valve assembly according to claim 14, wherein the biasing member is a coil spring seated within a spring opening of the lever housing.

18. The system for venting a control chamber of a flush valve assembly according to claim 14, further comprising:

a pin extending through a pin hole in said lever; and wherein said lever housing comprises:

an opening configured and arranged to seat said biasing member therein;

a slot extending therethrough, wherein said lever extends through said slot such that said first end of said lever is on one side of said lever housing and said second end of said lever is on an opposite side of said lever housing; and a pin slot that receives said pin.

\* \* \* \* \*